(12) United States Patent
Lochbihler (10) Patent No.: US 9,718,297 B2
(45) Date of Patent: Aug. 1, 2017

(54) SECURITY ELEMENT FOR SECURITY PAPERS, VALUE DOCUMENTS OR THE LIKE

(71) Applicant: GIESECKE & DEVRIENT GMBH, Munich (DE)

(72) Inventor: Hans Lochbihler, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 77 days.

(21) Appl. No.: 14/364,155

(22) PCT Filed: Dec. 19, 2012

(86) PCT No.: PCT/EP2012/005275
§ 371 (c)(1),
(2) Date: Jun. 10, 2014

(87) PCT Pub. No.: WO2013/091858
PCT Pub. Date: Jun. 27, 2013

(65) Prior Publication Data
US 2014/0353959 A1    Dec. 4, 2014

(30) Foreign Application Priority Data
Dec. 20, 2011 (DE) .................... 10 2011 121 588

(51) Int. Cl.
*B42D 25/324* (2014.01)
*B42D 25/00* (2014.01)
(Continued)

(52) U.S. Cl.
CPC ........... *B42D 25/342* (2014.10); *B42D 25/00* (2014.10); *B42D 25/29* (2014.10); *B42D 25/324* (2014.10);
(Continued)

(58) Field of Classification Search
CPC .............. B42D 25/324; B42D 2033/24; B42D 2035/30
See application file for complete search history.

(56) References Cited

U.S. PATENT DOCUMENTS 5,503,902 A * 4/1996 Steenblik ................. B41M 3/14
428/141
6,819,775 B2   11/2004 Amidror et al.
(Continued)

FOREIGN PATENT DOCUMENTS

CN   101443681 A   5/2009
CN   101472746 A   7/2009
(Continued)

OTHER PUBLICATIONS

Holmes et al. (2012/0274998); U.S. Appl. No. 61/272,773 (Oct. 30, 2009).*
(Continued)

*Primary Examiner* — Kyle Grabowski
(74) *Attorney, Agent, or Firm* — Workman Nydegger (57) ABSTRACT

A security element for manufacturing value documents, such as banknotes, checks or the like, has an upper side making available several micro images, in particular for a lens magnification arrangement. Each micro image is formed by a micro cavity structure having a multitude of micro cavities disposed side by side, the micro cavities have an extension of 0.5 to 3 μm respectively in a spatial direction disposed parallel to the upper side. The micro cavity structure is optically reflective or highly refractive on its surface, so that on the surface at least partial reflection takes place, and for each micro image micro cavities of at least a first and a second type are present, which differ by an aspect ratio of the micro cavities, whereby each micro image is structured by the at least two different types of micro cavities.

23 Claims, 9 Drawing Sheets (51) Int. Cl.

| | | |
|---|---|---|
| *B42D 25/342* | (2014.01) | |
| *G02B 5/08* | (2006.01) | |
| *G02B 5/18* | (2006.01) | |
| *G02B 27/60* | (2006.01) | |
| *B42D 25/29* | (2014.01) | |
| *G02B 3/00* | (2006.01) | |
| *G02B 5/09* | (2006.01) | |
| *G02B 5/28* | (2006.01) | |
| *B42D 25/45* | (2014.01) | |

(52) U.S. Cl.
CPC ............. *G02B 3/0056* (2013.01); *G02B 5/08* (2013.01); *G02B 5/09* (2013.01); *G02B 5/18* (2013.01); *G02B 5/285* (2013.01); *G02B 27/60* (2013.01); *B42D 25/45* (2014.10); *B42D 2033/24* (2013.01); *B42D 2035/20* (2013.01); *B42D 2035/44* (2013.01); *Y10T 29/49826* (2015.01)

(56) References Cited

U.S. PATENT DOCUMENTS

| | | |
|---|---|---|
| 7,006,294 B2 | 2/2006 | Steenblik et al. |
| 7,145,723 B2 | 12/2006 | Tompkin et al. |
| 7,221,512 B2 | 5/2007 | Steenblik et al. |
| 7,468,842 B2 | 12/2008 | Steenblik et al. |
| 7,830,627 B2 * | 11/2010 | Commander ........ B42D 25/342 359/820 |
| 7,995,278 B2 | 8/2011 | Endle et al. |
| 8,000,009 B2 | 8/2011 | Steenblik et al. |
| 8,027,093 B2 | 9/2011 | Commander et al. |
| 8,094,376 B2 | 1/2012 | Schilling et al. |
| 8,238,027 B2 | 8/2012 | Tompkin et al. |
| 8,514,493 B2 | 8/2013 | Endle et al. |
| 8,534,708 B2 | 9/2013 | Heim et al. |
| 8,840,146 B2 | 9/2014 | Stalder |
| 2002/0012447 A1 | 1/2002 | Amidror et al. |
| 2003/0179364 A1 | 9/2003 | Steenblik et al. |
| 2003/0232179 A1 | 12/2003 | Steenblik et al. |
| 2004/0239099 A1 | 12/2004 | Tompkin et al. |
| 2007/0269725 A1 | 11/2007 | Steenblik et al. |
| 2007/0273142 A1 | 11/2007 | Tompkin et al. |
| 2008/0160226 A1 * | 7/2008 | Kaule ................... B42D 25/29 283/72 |
| 2009/0179418 A1 | 7/2009 | Stalder |
| 2009/0237795 A1 | 9/2009 | Koivukunnas et al. |
| 2010/0103528 A1 | 4/2010 | Endle et al. |
| 2010/0109317 A1 * | 5/2010 | Hoffmuller ............ B42D 25/29 283/91 |
| 2010/0194091 A1 | 8/2010 | Heim et al. |
| 2010/0277805 A1 | 11/2010 | Schilling et al. |
| 2011/0122499 A1 | 5/2011 | Commander et al. |
| 2011/0255171 A1 | 10/2011 | Endle et al. |
| 2011/0299150 A1 | 12/2011 | Steenblik et al. |
| 2012/0146323 A1 * | 6/2012 | Schilling ................ B42D 25/29 283/85 |
| 2012/0193905 A1 | 8/2012 | Schilling et al. |
| 2012/0274998 A1 * | 11/2012 | Holmes ................. B42D 25/29 283/72 |
| 2014/0106091 A1 | 4/2014 | Stalder |

FOREIGN PATENT DOCUMENTS

| | | | |
|---|---|---|---|
| DE | 102006050047 A1 | 4/2008 | |
| DE | 102008046128 A1 | 3/2010 | |
| EP | 1476317 A1 | 11/2004 | |
| EP | 1434695 B1 | 2/2005 | |
| EP | 1979768 A1 | 10/2008 | |
| EP | 1182054 B1 | 5/2009 | |
| GB | WO 2011051670 A2 * | 5/2011 | ............. B42D 25/29 |
| WO | 02/101669 A2 | 12/2002 | |
| WO | 2005/095119 A1 | 10/2005 | |
| WO | 2005/106601 A2 | 11/2005 | |
| WO | 2010/048015 A1 | 4/2010 | |
| WO | 2011/029602 A2 | 3/2011 | |

OTHER PUBLICATIONS

International Search Report for corresponding International Application No. PCT/EP2012/005275, Apr. 16, 2013.
Ichikawa, Hiroyuki, "Numerical Analysis of Microretroreflectors: Transition from Reflection to Diffraction", Journal of Optics A Pure and Applied Optics, vol. 6, No. 3, pp. S121-S127, Feb. 24, 2004.
International Preliminary Report on Patentability for corresponding International Application No. PCT/EP2012/005275, Jun. 24, 2014.
Chinese Search Report from CN Application No. 2012800701551, Dec. 8, 2015.

* cited by examiner

SECURITY ELEMENT FOR SECURITY PAPERS, VALUE DOCUMENTS OR THE LIKE

BACKROUND

The invention relates to a security element for manufacturing value documents, such as banknotes, checks or the like, having an upper side making available several micro images.

The invention further relates to a value document having such a security element.

The invention also relates to a manufacturing method for a security element for value documents, such as banknotes, checks or the like, wherein a substrate is made available that has an upper side, and on the upper side several micro images are produced.

Such micro images are needed in particular for moire magnification arrangements. There, a lens arrangement is formed above the micro images for their magnification, and one lens is allocated to each micro image. The micro images are so imaged by the microlenses disposed in a grid above that a viewer perceives the micro image as enlarged by a moire pattern. Moire arrangements that are suitable as security elements, for example for banknotes, must not add perceptibly to the thickness of the substrate, e.g. banknote paper. This results in a limitation of the maximum lens size, which in turn limits the size of the micro images disposed underneath. The practicable area of each micro image lies between 20×20 μm² and 30×30 μm². A lower limit for the lens diameter and the size of the micro images is set by the wave nature of the light, since the light scattering increases as the structural sizes for lenses and micro images decrease, and the imaging properties worsen. Further, the manufacturing effort increases as the size of the micro images decreases, if the micro images are not to lose exactness of detail.

However, micro images are also used to identify value documents as inconspicuously as possible, in this case of course without integrated magnification arrangement.

The configuration of micro images for moire magnification arrangements is already discussed in the state of the art in many respects.

EP 1 434 695 B1 describes an absorbing structure with a period that is smaller than the light wavelength. The structure is set up as a cross grating with sinusoidal profile.

WO 2005/106601 A2 relates to moire magnification arrangements with micro images consisting of anti-reflecting regions and partly reflecting regions. The anti-reflecting area is formed by nanostructures with a period smaller than 700 nm and a depth between 150 and 350 nm.

EP 1 979 768 A1 explains multilayer bodies having a microlens arrangement, in which micro images are produced by micro holes or by regions of different opacity.

In EP 1 182 054 B1 retroreflectors are allocated to microlenses in order to minimize imaging errors of the moire arrangement.

In WO 2011/029602 A2 curved micro images are provided to prevent imaging errors in microlens arrangements. The structuring of the micro images takes place through diffractive relief structures such as diffraction gratings or holograms, diffractive structures of zero order, matt structures or moth-eye structures.

WO 2002/101669 A2 describes micro images formed by fine dots or perforations.

EP 1 476 317 A1 and U.S. Pat. No. 7,468,842 B2 describe concave and/or convex surfaces, image elements as relief surfaces that are filled with ink, and light trap patterns formed by sub-wavelength structures to produce micro images for moire magnification arrangements.

In WO 2010/048015 A1 finally a method is described for manufacturing micro images for moire magnification arrangements, wherein a radiation-sensitive donor layer is partly removed or transferred in order to effect a lateral structuring of the layer.

From DE 10 2008 046 128 A1 a matt structure for a security element is known that has a multiplicity of micro elements with a lateral dimension of below 50 μm in each case, wherein at least one geometry parameter of the micro elements varies randomly in order to produce the matt effect. The geometry parameter can be the depth of the micro elements.

SUMMARY

It is the object of the invention to so configure the known micro images, in particular for (magnifying) lens arrangements, that the falsification security is increased by making a great richness of detail possible for the micro image without increasing the manufacturing effort through sophisticated printing methods etc.

This object is achieved by a security element of the type mentioned at the outset, wherein each micro image is formed by a micro cavity structure having a multiplicity of micro cavities disposed side by side, wherein the micro cavities have an extension of 0.5 μm to 3 μm respectively in a spatial direction parallel to the upper side, the micro cavity structure is optically reflective or highly refractive on its surface, so that on the surface at least partial reflection takes place, and for each micro image, image information is formed through a modulation of the aspect ratio of the micro cavities.

The object is further achieved by a manufacturing method of the type mentioned at the outset, wherein each micro image is formed by a micro-cavity structure having a multiplicity of micro cavities disposed side by side, wherein the micro cavities are given an extension of 0.5 to 3 μm respectively in a spatial direction disposed parallel to the upper side, the micro-cavity structure is configured to be optically reflective or highly refractive on its surface, so that on the surface at least partial reflection takes place, and for each micro image, image information is formed through a modulation of the aspect ratio of the micro cavities.

The object is finally also achieved with a value document having a security element according to the invention.

According to the invention, each micro image is formed by a micro cavity structure having a multiplicity of micro cavities disposed side by side that are optically reflective on their surface. The image information of the micro images is coded by the shape of the micro cavities and in particular by the aspect ratio of the micro cavities. The aspect ratio has an effect on the brightness with which each micro cavity reflects light.

It is essential for the production of the micro image that the security element makes available micro cavities of a first and a second type, which differ with regard to the aspect ratio. The micro image is structured by means of these types of micro cavities. The aspect ratios of the micro cavities are consequently arranged in accordance with a predetermined distribution and thereby deterministically, in order to produce the micro image.

The micro images can also be used without magnifying lens arrangements, since they show a great richness of detail or a high resolution.

The optical properties of micro cavities whose aperture width is in the range of many micrometers and more, thereby being larger by orders of magnitude than the wavelength of the incident light, can be described by geometric optics. Such micro cavities can have retro-reflective properties in the case of certain geometries. However, when the aperture width lies within the order of magnitude of the light wavelength, the light diffraction on the cavities dominates, whereas the laws of geometric optics are valid only as an approximation (cf. H. Ichikawa, "Numerical analysis of microretroreflectors: transition from reflection to diffraction", J. Opt. A, Pure Appl. Opt. 6, p. 121, 2004). The diffraction conduct of micro cavities with aperture widths in the micrometer range, as employed by the invention, has not yet been scientifically examined in its entirety. This is applicable in particular to micro cavities covered by a multilayer.

The micro cavities used in the security element are so large that a light diffraction does not dominate (any more), and on the other hand so small that geometric-optical reflection does not dominate (yet). This intermediate range has turned out to be advantageous with regard to the producibility and falsification security of the security element. Since additionally the micro image size, as explained above, is limited by the maximally admissible lens size, an advantageous richness of detail for a micro image can be achieved when the micro cavities cannot be resolved at least in one spatial direction (viewed in parallel to the upper side) when viewed through an arrangement of lenses. Below a dimensioning of 2-3 μm a diffraction of the light gradually occurs on structures in orders of magnitude of the wavelength, whereby the scattered or diffracted proportion of the reflected light increases. Above this limit, in contrast, the proportion of specularly reflected light increases. The profile shape of the micro cavities becomes more important then, which in turn increases the production requirements. A lateral aperture width of a micro cavity no larger than 3 μm or below 2 μm is therefore advantageous. Below 0.5 μm the light diffraction dominates, which would substantially impede a simple imaging. Consequently, in total there results a lateral size of the micro cavities in at least one spatial direction of between 0.5 μm and 3 μm, particularly preferably larger than/equal to 0.7 μm and/or smaller than 2 μm.

The chosen size range realizes a good optical effect of the micro cavities, which, in contrast to retro-reflecting cavities of an aperture width larger than 10 μm or more, can in particular be combined well with microlenses, with the manufacture being comparably simple.

Surprisingly, larger cavities would increase the manufacturing effort, since the exact profile shape would become relevant then. The micro cavities according to the invention are in particular no retroreflectors.

Since every micro cavity can be interpreted as an image element in the form of a pixel at the same time, the chosen size range additionally leads to a good pixel density in usual micro image sizes.

By varying the aspect ratio of the micro cavities the intensity with which the individual micro cavities scatter back the light is modulated, thus producing an image structure. The aspect ratio is the ratio between the maximum depth and the minimum lateral extension, and is varied in accordance with the desired image structure in the security element. Sophisticated printing methods to make available small, and nonetheless finely structured micro images are therefore no longer required. Instead, simple replicating methods can be employed for producing micro cavities. The image information can be represented already by the corresponding distribution of the two types of micro cavities in the form of a black and white image, when two types of aspect ratios are employed. A higher number of aspect ratios or a continuous variation of the aspect ratio is of course possible and leads to a grayscale image.

From a manufacturing perspective it is noteworthy that the surface coating for the micro cavities does not need to change laterally to produce different brightnesses. It can be identical, and still a different brightness impression is achieved for micro cavities with different aspect ratio.

The micro cavities for making available the image information can additionally be complemented by sub-wavelength structures, for example in the form of moth-eye structures, which can make available an image element or a part of the motif of the micro image, in particular a background. Also the matt structure known from DE 10 2008 046 128 A1 can be used for this purpose.

In a different preferred embodiment the micro cavities for making available the image information can also additionally be complemented by regions with substantially smooth or unstructured surface, which can make available an image element or a part of the motif of the micro image, in particular a background To increase the richness of detail, it is preferable to configure such micro cavities that are disposed in the region of a contrast change (light-dark border) of an element of the motif to be asymmetrical, to the effect that the regions of the micro cavity disposed on the dark side of the motif are configured geometrically different to those regions disposed on the light side of the section. This is important in particular in the realization of very fine motifs, to prevent a pixelation by the micro cavities here.

The micro cavities can fundamentally have any desired shape regarding their aperture, for example square apertures. However, it is also possible to so configure micro cavities that their edges form the border region of an image element or motif of the micro image. Thereby image regions within the micro image can be sharply delimited from each other, since the edges of the image element are very clearly visible.

Several micro images are usually arranged in a pattern, e.g. matching a lens arrangement disposed thereabove. It is preferred that the micro cavities form both the motifs of the micro images and the motif background, wherein the differences are realized by a variation of the aspect ratio of the micro cavities that is clearly predetermined as a result of the micro image to be produced. In a simple embodiment also only the micro images can be formed by the different types of micro cavities, while the motif background is formed by regions with smooth surface.

The security element with the micro cavities can also be used for producing micro images for arrangements represented in an unscaled fashion, which have an optical effect that is hard to imitate even without making use of a moire effect. These are arrangements in which at least two different images with a lens arrangement disposed thereabove are represented in an unscaled fashion, thus neither magnified nor reduced in size. The micro images in this case correspond to an unscaled detail of the image to be represented respectively. This is referred to as "unscaled representation" in the following. In an embodiment of the invention it is provided that the micro cavities are disposed on at least two different height levels within a micro image allocated to the respective image. The micro cavities of the first type therein are arranged on a respectively different plane than the micro cavities of the second type. In this fashion, for example a clearly recognizable alternating image, a motion image, a pump image, a morph image or a stereo image can be produced.

The geometry of the micro cavities is by no means limited to rotationally symmetric shapes or such shapes that have a circular outline in plan view, thus with regard to their aperture. Aspheres or free-form areas, such as known e.g. from lamp reflectors, can be employed likewise. For the micro cavities further a non-rotationally symmetric aperture is possible, in particular a channel-shaped aperture. The two types can then differ with regard to the direction along which the non-rotationally symmetric micro cavities extend. In particular, also channel-shaped depressions can be employed, having for example the shape of a half cylinder that is curved only in one direction, but extends longitudinally in the other.

Further, also such effects can be realized by non-rotationally symmetric micro cavities with different orientation that convey a three-dimensional object impression to a viewer. For this purpose the height information or the distance to the viewer of the object to be reproduced can be coded by the orientation angle of such micro cavities. In this case a viewer perceives a laterally different parallax of the flat surface structured with micro cavities. The three-dimensional impression can be intensified by additionally varying the structure depth of the micro cavities as a function of the height or of the reflective properties of the object in the production of the micro cavities. A three-dimensional impression can also be achieved when the intensity profile of the motif is implemented pixel-by-pixel in such micro cavities having a coded orientation angle.

Finally, also the cross-section of the channel-shaped micro cavities is not limited to symmetric geometries. Asymmetric geometries can produce a focusing of light in the direction of a viewer through a "blaze" effect. Thereby the light yield perceived by the viewer can be increased.

The micro cavities can optionally be coated with a thin-film coating in order to produce a color impression. If a so-called color-fix coating is chosen which does not change the color upon the tilting of the security element, thus variation of the viewing angle, a pronounced light/dark contrast is obtained in the regions of micro cavities with different aspect ratio. The regions filled with shallower micro cavities covered with a color-fix coating therein show a strong, saturated color tone, whereas the regions of the deep micro cavities appear pronouncedly dark. As coating the layer sequence 10 nm Cr, 210 nm ZnS with 60 nm Al as mirror layer disposed underneath is suitable. However, also a semitransparent layer structure can be chosen, e.g. 15 nm aluminum, 75 nm ZnS and 15 nm aluminum.

If a so-called color-shift coating or an interference layer structure is employed which effects a color impression dependent on the viewing angle (color shift), also the color impression is dependent on the aspect ratio. If such interference layer structures that show a color change on smooth surfaces upon tilting are applied to micro cavities, shallow micro cavities appear in approximately the same color tone as the perpendicularly reflected light of the smooth surface. In contrast, deep micro cavities (aspect ratio>0.4) assume approximately the color tone of a smooth surface in the tilted state. In micro cavities coated in this fashion it is consequently possible to vary not only the brightness, but also the color tone through the choice of the aspect ratio.

The color effect distinguishes the micro cavities according to their geometric variation. It is therefore unnecessary to structure the coating effecting the color effect. It is preferably applied areally above the micro cavity structure. For a black and white image or a grayscale image the micro cavities are preferably free of a coating having a dispersion that is dependent on the angle of incidence for producing a color effect.

For the manufacturing method according to the invention in particular direct exposure techniques come into question, e.g. with the aid of a laser writer. The manufacture can take place analogously to the known manufacturing methods for microlenses. The original of the micro cavity structure is written onto a substrate coated with photoresist via direct exposure with the aid of a laser writer, and the exposed portion of the photoresist is removed subsequently. An exposed original can be electroformed subsequently, thus producing an embossing die. Finally, the structure is replicated via an embossing process for example in a UV lacquer on a foil or directly (e.g. by hot stamping into the surface of the foil). Alternatively, a nanoimprint method can be used. More sophisticated methods for the manufacture of originals such as electron beam or focused ion beam exposure methods permit an even finer embodiment of the geometry of the micro cavities. These manufacturing methods offer many configuration possibilities with regard to the choice of the geometry of the micro cavities. Thus, without additional effort also non-rotationally symmetric and/or non-spherical geometries of micro cavities can be realized with greater exactness than in the above-mentioned laser direct exposure method.

Subsequently a coating of the surface takes place, e.g. with a reflective layer and/or a structure effecting a color effect, e.g. an interference layer structure and/or a color layer, e.g. a color-fix coating. For this purpose, electron beam vapor deposition, sputtering or thermal vaporizing in a vacuum come into question. The coating can be omitted if the surface is already innately reflective. Ultimately, the structure is laminated preferably with a cover layer for protection.

At a constant aperture width, micro cavities with different aspect ratios can also be produced merely by a variation of the depth of the micro cavities, for example via a corresponding variation of the exposure intensity of a laser writer. Such a procedure offers the advantage of a substantially easier data preparation.

The security element can be configured in particular as a security thread, tear thread, security band, security strip, patch, foil element or as a label. In particular, the security element can bridge transparent regions or gaps and/or be used for a security card or an identification document (e.g. passport).

The security element can in particular form part of a not yet circulable precursor to a value document, which can for example also have further authenticity features (such as e.g. luminescent substances provided in the volume) besides the security element according to the invention. Value documents are understood here to be, on the one hand, documents having the security element. On the other hand, value documents can also be other documents and objects that can be equipped with the security feature according to the invention in order for the value documents to have uncopiable authenticity features, thereby making it possible to check authenticity and at the same time preventing unwanted copies. Chip cards or security cards such as e.g. bank cards or credit cards are further examples of a value document.

The production method according to the invention can be so configured that the described preferred configurations and embodiments of the security element are produced.

It is evident that the features mentioned above and those to be explained hereinafter are usable not only in the stated combinations, but also in other combinations or in isolation, without going beyond the scope of the present invention. In particular, the feature of the perforation can be omitted in all embodiments explained generally so far and in detail in the following.

BRIEF DESCRIPTION OF THE DRAWING

In the following the invention is explained in more detail by way of example with reference to the accompanying figures that also disclose essential characteristics of the invention. The figures are described as follows.

DETAILED DESCRIPTION OF VARIUOS EMBODIMENTS

In the Figures a security element 10 will hereinafter be described which makes available micro images to which a respective lens (for the magnification of the micro images) is allocated that is disposed thereabove. This arrangement can be a known moire magnification arrangement as known from the state of the art for security elements of value documents, for example of banknotes. The combination of the micro images with magnifying lens arrangements is optional, however, and the micro images as produced with the structure described hereinafter can also be employed in the security element 10 with a lens arrangement for unscaled representation or without lens arrangement.

The security elements described here have in common that the micro image is made available by a micro cavity structure. The individual micro cavities are so dimensioned, particularly with regard to their minimum aperture width, that neither light diffraction nor specular reflection are the dominant mechanisms in reflecting the incident radiation, but a backscatter. The image information is not produced by a printed image with different printing inks, but by the micro cavities that differ with regard to their aspect ratio. In dependence thereon the individual micro cavities reflect the incident radiation with different intensity, so that the information of each micro image is coded by the aspect ratio of the micro cavities.

The light backscatter is adjusted by the aspect ratio of the micro cavities. The brightness of the radiation backscatter is thus not adjusted by the aperture of the micro cavity alone. The aspect ratio therein is the ratio between the minimum aperture width and the maximum depth of a micro cavity.

Figure 1:
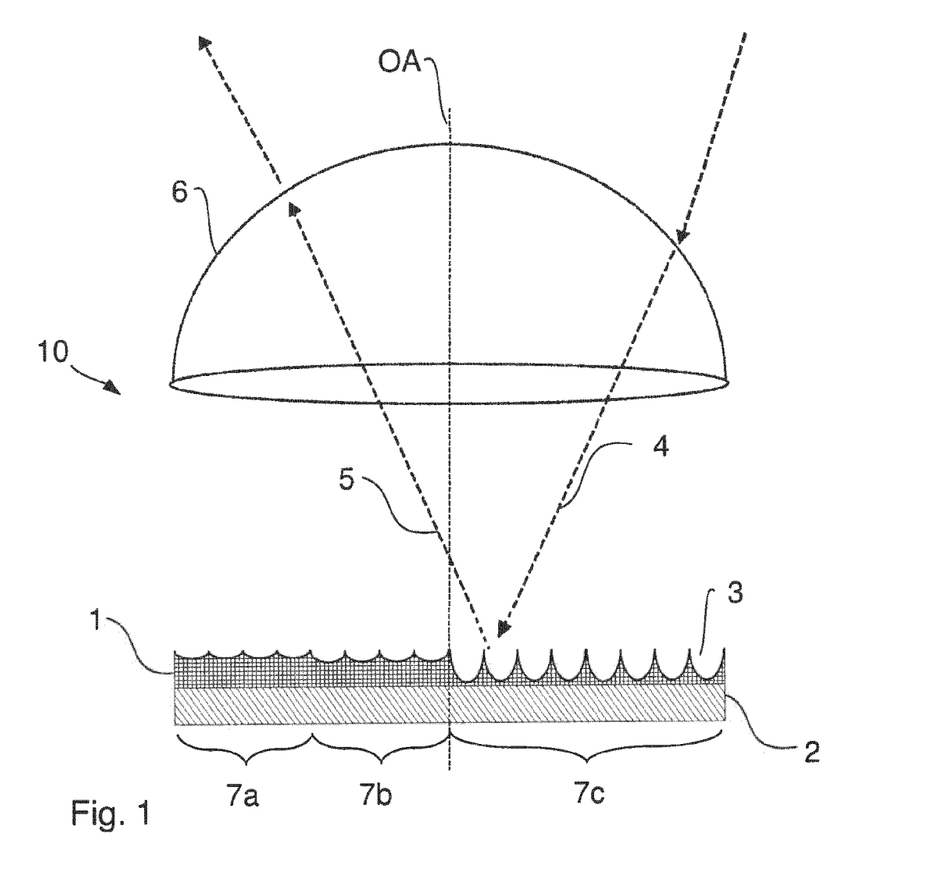
FIG. 1 a schematic representation of a part of a security element, namely a micro cavity structure and a lens arranged thereabove, FIGS. 2 to 6 schematic representations of different geometries that are possible for the micro cavity structure of FIG. 1, FIGS. 7 and 8 plan views of a micro image as producible in the embodiment according to FIG. 1, FIG. 9 a further plan view of a modified mode of construction, FIGS. 10 and 11 two different embodiments of patterns with micro images, FIG. 12 a representation similar to FIG. 1 of a micro cavity structure complemented by sub-wavelength structures to produce a black background, FIGS. 13 and 14 raster electronic recordings of a micro image having the structure of FIG. 12, FIG. 15 a plan view similar to FIG. 7 of a modified mode of construction, and FIG. 16 a schematic representation similar to FIG. 1.

FIG. 1 schematically shows a sectional representation of a reflecting micro cavity structure 1 formed in a substrate 2. On its upper side said substrate 2 has several concave micro cavities 3 configured as spherical depressions in the shown case. The depressions have a reflective surface, for example through a suitable coating. The micro cavities 3 have a back-scattering effect on incident light.

Above the micro cavity structure 1 a lens 6 is arranged which images a micro image 9 (magnified) that is formed by the micro cavity structure 1. A part of the incident radiation 4 therein is scattered on the micro cavities 3 of the micro cavity structure 1 at the represented solid angle (radiation 5) and guided through the lens 6 in the direction of the viewer. In the case of a moire magnification arrangement a viewer perceives a magnified image through the interaction of a multiplicity of periodically arranged micro images 9 and lenses 6. In the case of an arrangement not shown here, producing an unscaled representation to produce for example an alternating image, a viewer sees different images upon viewing from two or more different viewing directions, said different images being effected by the lenses which, from the different viewing directions, image different micro images allocated to different images.

The micro image 9 is produced by the micro cavity structure 1 comprising the micro cavities 3 disposed side by side which do not all have the same aspect ratio. In the schematic representation of FIG. 1 three regions 7a, 7b and 7c are recognizable, in which the micro cavities of identical aperture in FIG. 1 are configured to have different depths. Through the different depth the brightness of the reflected radiation 5 changes, so that the three regions 7a-c appear differently bright. This geometric variation modulates image contents of the micro image 9.

The FIGS. 2 to 6 show examples of different possible micro cavities 3. In FIG. 1 a micro cavity structure 1 is represented exemplarily that has four micro cavities 3 for the purpose of illustration. Its surface is formed respectively by the geometry of a conic section. The apertures, i.e. the plan views along the optical axis OA of FIG. 1, are equal in two lateral spatial directions, i.e. transversally to the optical axis OA. The depth and therefore the aspect ratio of the micro cavities 3 varies laterally, however. Since the light backscatter strongly depends on the aspect ratio, the complete right micro cavity of the micro cavity structure of FIG. 2 appears darker than the one adjacent to the left, etc. The smaller the aspect ratio (lateral extension/depth) is, i.e. the shallower the micro cavity is, the brighter is the micro cavity 3.

Figure 3:
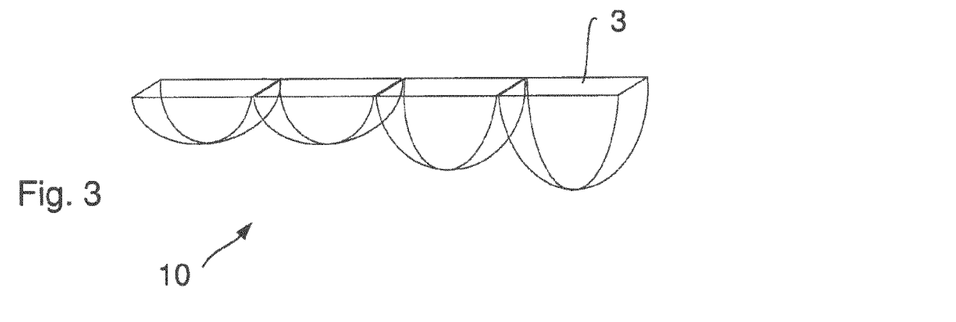

The apertures of the micro cavities 3 are of course not limited to rotationally symmetric and of course not to uniform shapes for all micro cavities. FIG. 3 shows a square aperture for the micro cavities 3, each showing the same depth profile in sectional planes that are perpendicular to each other and intersecting each other in the optical axis.

Figure 4:
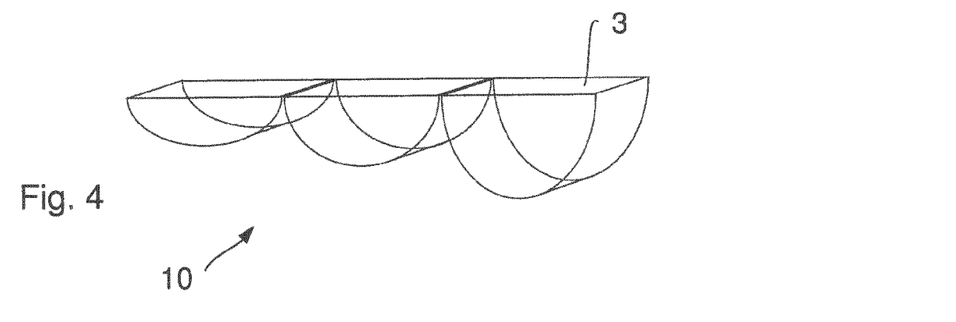

Also such depressions are possible which are curved only in one direction and not curved in the other direction. FIG. 4 shows such a micro cavity structure 1.

Figure 2:
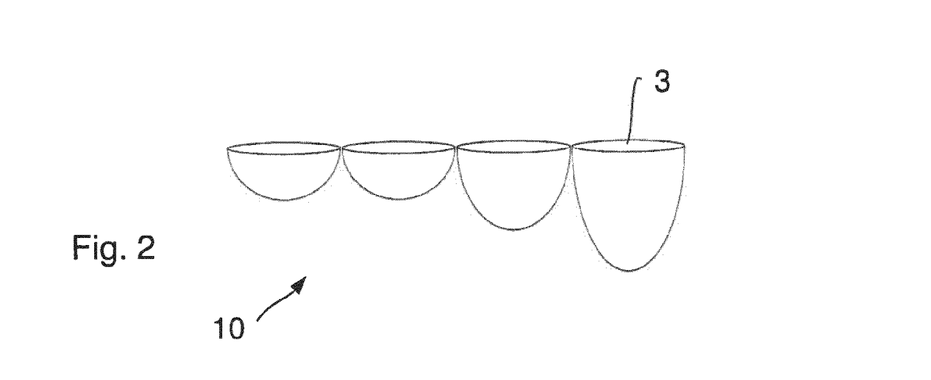
Figure 5:
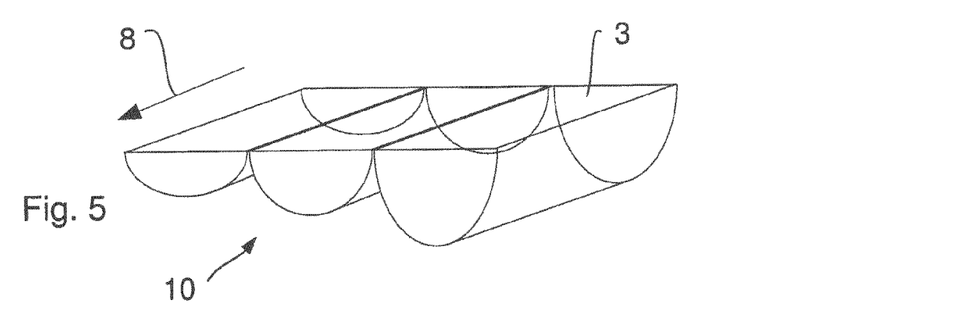

The micro cavity structures 1 of FIGS. 2 to 4 have in common that their apertures, exemplarily as a square or a circle, do not have an aperture width that is substantially larger than 3 µm. However, it is sufficient for the production of the micro image 9 when this limitation is complied with in only one direction parallel to the surface. Corresponding non-rotationally symmetric, channel-shaped micro cavities 3 are shown in FIG. 5. The micro cavities 3 of the micro cavity structure 1 shown there extend along a direction 8, possibly also over substantially more than 3 μm.

Figure 6:
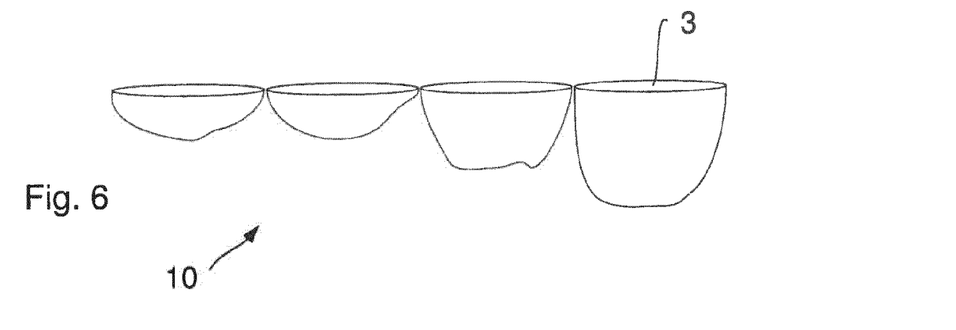

The overall concave curvature of the micro cavities 3 is not limited to half ellipses or semicircles. Aspherical curvatures or also asymmetrical forms can be employed, as shown in FIG. 6 for example. Here the micro cavities 6, although still concave in total, have irregularly curved surfaces and partly also convex sections.

The optical effect of light scattering on micro cavities 3 of such micro cavity structures 1 depends on the detailed surface curvature only marginally, since the minimum aperture widths are between 0.5 μm and 3 μm. Therefore, the interaction with the incident light is no longer mandatorily and solely ruled by the laws of geometric optics, but an interaction of electromagnetic waves also takes place. Modifications of the curvature of micro cavities in the wavelength range or sub-wavelength range therefore do not have a significant effect on the scattering conduct of such micro cavities 3. This has the advantage that in the manufacture of the micro cavity structure 1 the micro cavities 3 which are intended to show different reflections must be varied substantially only with respect to one parameter, namely the aspect ratio (minimum lateral extension to maximum depth). This facilitates the manufacture substantially, since no increased precision requirements are posed with regard to the profile shape.

Figure 7:
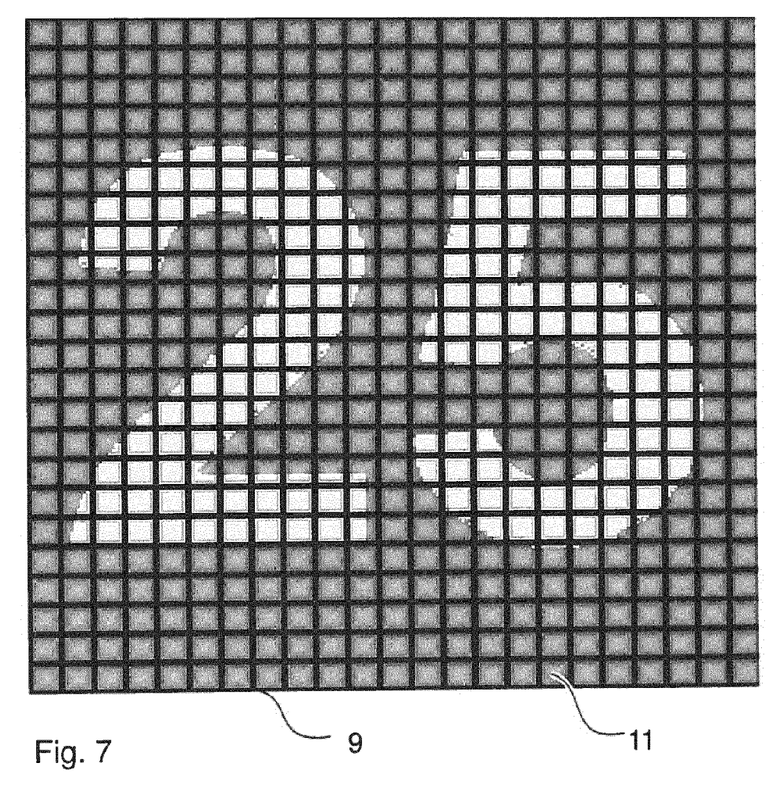
Figure 8:
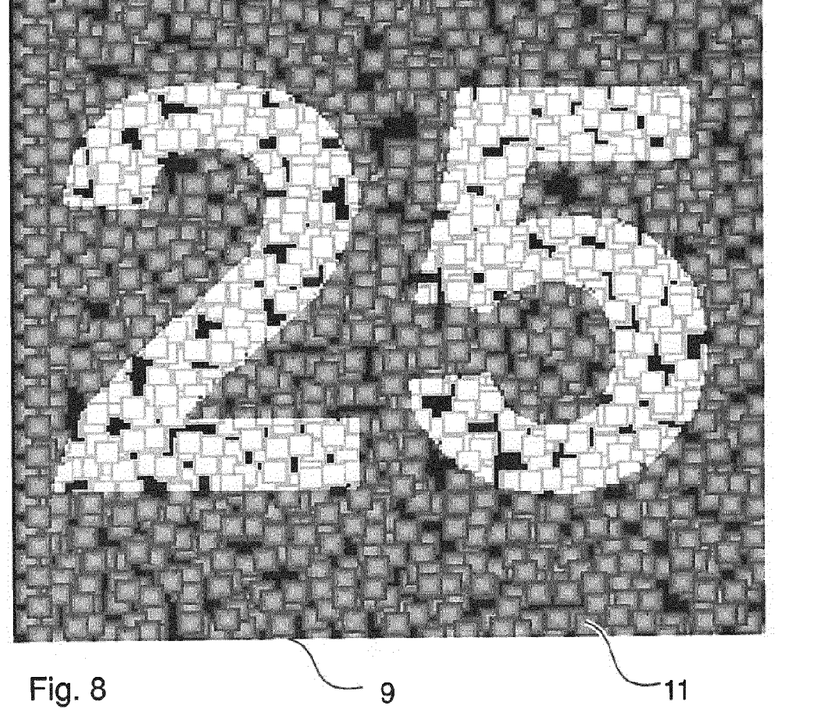

FIG. 7 shows a micro image 9 of the size of 23×23 μm² with a number motif "25". It is formed by micro cavities 3 of the size 1×1 μm². Each micro cavity 3 is a pixel 11. The micro cavities 3 are arranged either periodically in a firm pattern (FIG. 7), which does not necessarily have to be a Cartesian grid, or aperiodically or quasi-statistically (FIG. 8). The gray values represented in FIGS. 7 and 8 therein reproduce the aspect ratio of the individual micro cavities 3. The micro cavities 3 within the number motif are around 40% deeper than the micro cavities 3 of the background. If a complementary color impression of the micro image is desired, the depth ratios of the micro cavities 3 can also be provided vice-versa. The micro cavities 3 within the background are deeper than the micro cavities of the number motif in this case.

Micro cavities 3 disposed in the border region of the motif are preferably deeper on the side of the motif than on the side of the background. This has the advantage that despite the relatively large pixelation or the small number of pixels, relatively fine patterns can still be reproduced by the cavities 3.

Figure 9:
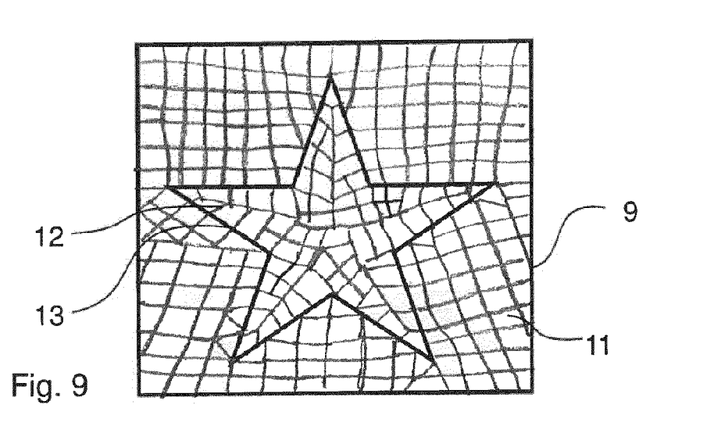

The design of a motif in the micro image 9 is not limited to cavities with square or symmetric apertures, as shown in FIG. 9. Here a micro image 9 can be seen that has a star as motif 12. The edges of the apertures of the pixels 11, i.e. of the micro cavities 3, are so configured that they coincide with the edge 13 of the motif 12. This effects that said edges are very clearly reproduced by the image scattered on the border region, and the edge 13 of the motif 12 is recognizable particularly well and clearly.

Figure 15:
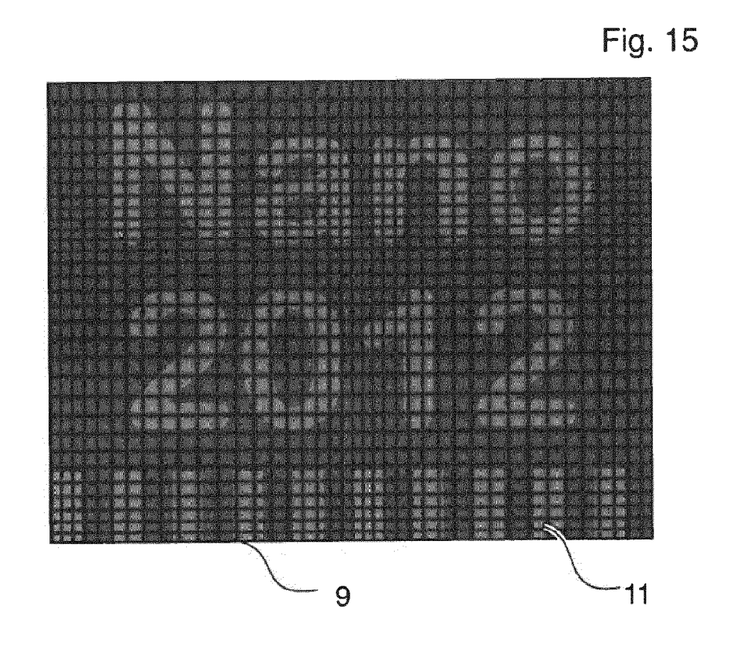

The design of a motif by a micro image is not limited to the selection between a periodic pattern and an aperiodic pattern for the micro cavity structure. It is thus possible to change the distance of the centers of the micro cavities, thus the width of the apertures, according to predetermined functions continuously along at least one direction. This embodiment is shown exemplarily in FIG. 15, in which likewise a micro image 9 with a motif can be seen. As a modification of the embodiment of FIG. 7, the aperture, i.e. the width of the micro cavities is varied in one direction (purely exemplarily in the horizontal). A two-dimensional variation is also possible of course. The background of this embodiment is that a strictly periodical arrangement of micro cavities can act as an optical grid and diffract incident light into different diffraction orders. At an oblique viewing angle, a viewer consequently perceives the surface as colorful as a consequence of the spectral splitting in the higher diffraction orders. The diffraction is prevented by the variation of the distance of the centers of the micro cavities, i.e. the apertures of the micro cavities. The motif of FIG. 15 therefore has micro cavities of different depths having a rectangular aperture, and the aperture width, i.e. the distance between the centers of adjacent micro cavities changes continuously in the horizontal. It amounts to 1 and 2 μm exemplarily. Already with a one-dimensional variation, but particularly effectively with a two-dimensional variation, the spectral splitting can be reduced or even suppressed completely. When such a micro cavity structure, i.e. such a micro image 9, is combined with lenses 6 to realize a moire magnification arrangement, the magnified image appears to be more uniform than in a variant with strictly periodically arranged micro cavities. The variation of the distance does of course not have to be continuous or linear (as shown in FIG. 15); it is sufficient when the regularity of the micro cavity structure is disturbed.

Figure 10:
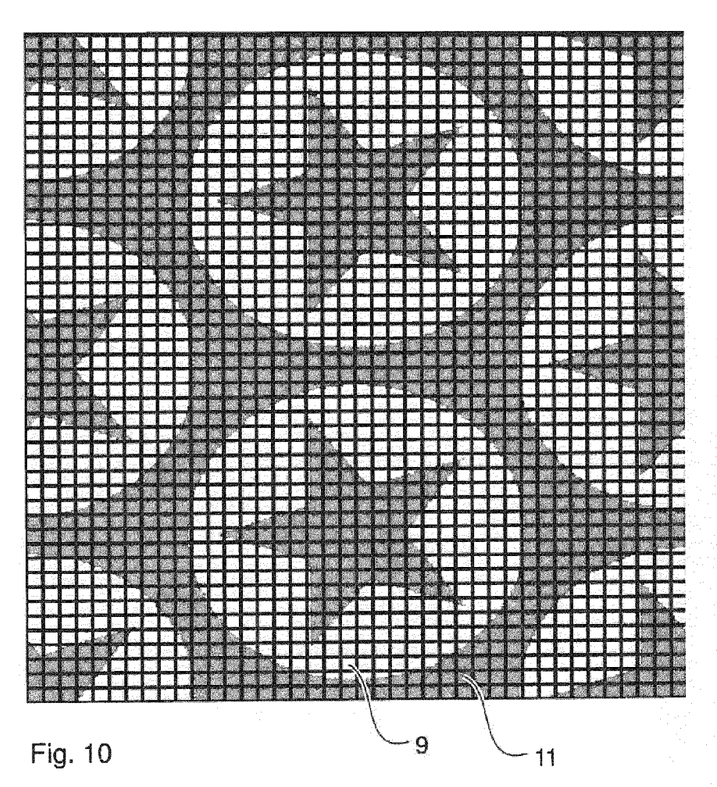

For the exemplarily explained moire magnification arrangement the micro images 9 are arranged side by side in a grid matching the pattern of the lenses 6. FIG. 10 shows a detail from a multiplicity of micro images 9 that are arranged in a hexagonal grid here. The pixels 11 therein form both the micro images 9 and the background disposed between the micro images 9.

Figure 11:
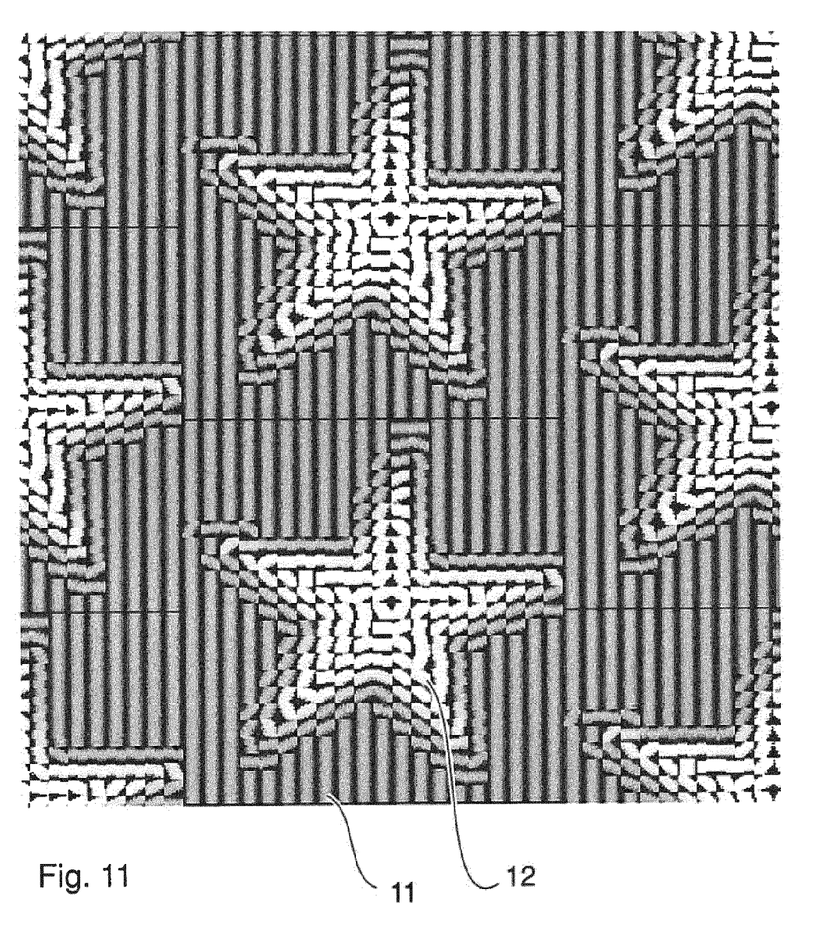

Such a realization of an arrangement of micro images 9 is not limited to pixels 11 or micro cavities 3 with rectangular aperture, as already explained. FIG. 11 shows the employment of channel-shaped micro cavities 3, as schematically represented in FIG. 5. However, in addition to the schematic representation of FIG. 5, now also the direction 8 of individual micro cavities 3, as well as the length of the channels is varied in order to structure the micro image 9. This can convey a three-dimensional impression of the motif 12 to the viewer, as already explained in the general part of the description.

The mentioned micro cavity structures 1 show an optical effect through backscatter. Preferably, said effect is increased by covering the surface of the micro cavity structure 1 with a metallic or highly refractive layer, so that at least a partial reflection takes place on the surface of the micro cavity structure 1 and thereby the micro cavities 3. The layer is preferably vapor-deposited. For vapor-depositing methods the common materials come into question, such as aluminum, silver, gold, copper, zinc, chromium and alloys thereof. Highly refractive layers can be produced by zinc sulfide, titanium dioxide or silicon. Such coatings deliver a particularly good light/ dark contrast of the micro cavities 3 of different aspect ratio. As already explained in the general part of the description, the coatings can also be executed as color-fix coating or color-shift coating already known for planar surfaces.

Figure 12:
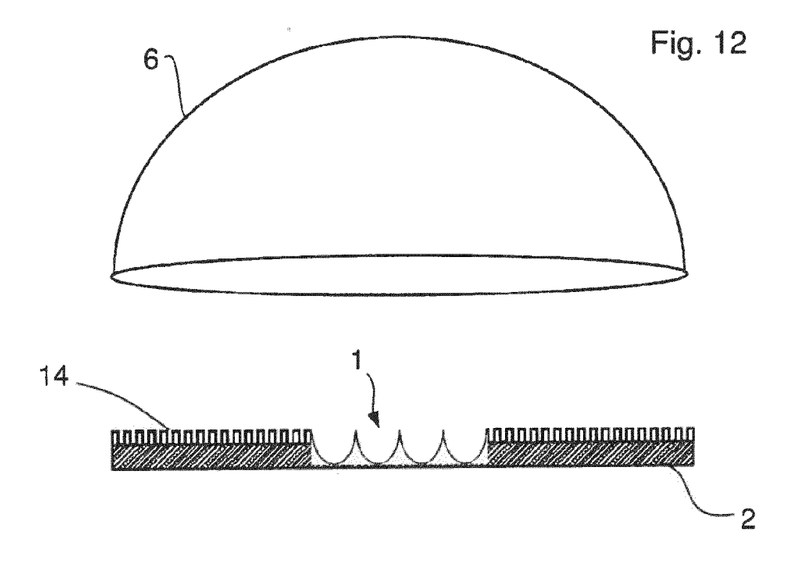
Figure 13:
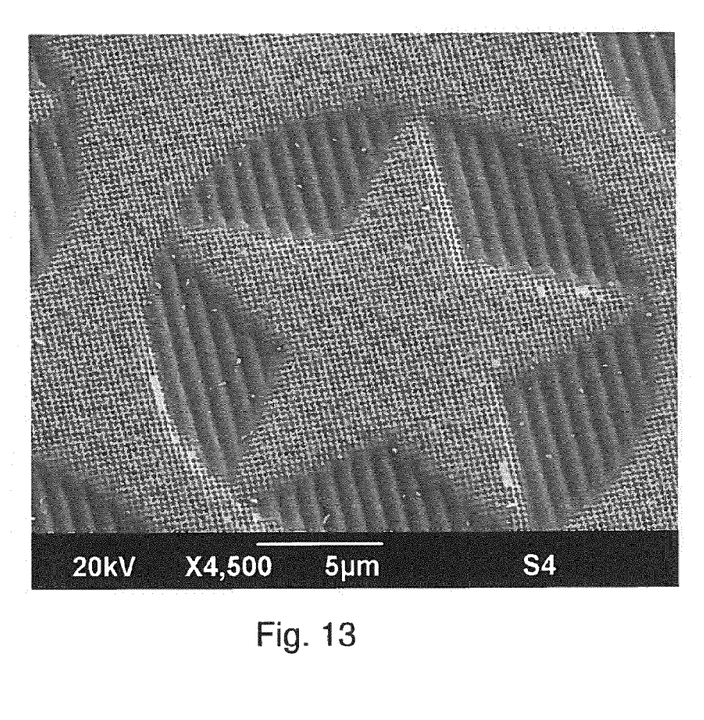
Figure 14:
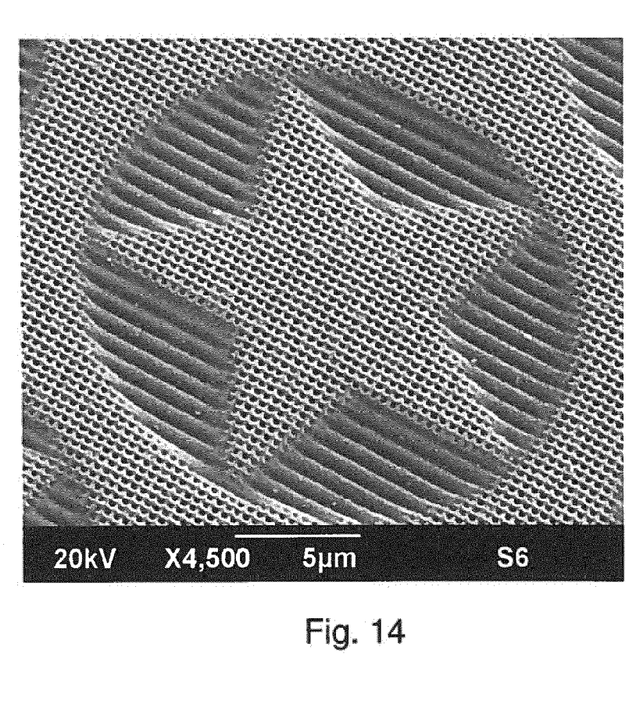

FIG. 12 shows a further possibility of increasing the light/ dark contrast by forming a sub-wavelength structure 14 on the substrate 2 in addition to the micro cavity structure 1. The FIGS. 13 and 14 show possible structures in the form of REM recordings of a micro image 9 having a star as motif 12. The star and the annular region surrounding the tips of the star is formed by a sub-wavelength structure with a period of 240 nm (FIG. 13) or 400 nm (FIG. 14). The surface of the intermediate region contains micro cavities 3 in a micro cavity structure 1, which (even if not represented) modulates the image information through the aspect ratio.

In a simple embodiment not shown here, the surface of the substrate 2 contains a smooth or unstructured region in addition to the micro cavity structure 1. Such a region forms for example a reflecting background of its own, while the micro images 9 are formed by micro cavities 3 in a micro cavity structure 1 modulating the image information through the aspect ratio.

The manufacture of the micro cavity structures 1, as explained in the general part of the description, takes place preferably by direct laser exposure in a photolithographic process. Micro cavities 3 with dimensions up to a minimum diameter of 0.5 μm can be written directly in photoresist with the aid of a laser writer. Due to the non-linear sensitivity of common photoresists, structures can be produced that are substantially finer than the beam diameter of the laser, if the exposure intensity is chosen suitably. Herein also structures can be produced with aspect ratios greater than 1 (depth greater than width). The depth can be varied very easily by the choice of the exposure intensity. For the manufacture of micro cavities with high exactness optionally also electron beam or focused ion beam exposure methods can come into question. After the exposure of the photoresist an exposed original can be subsequently electroformed and replicated via an embossing process in UV lacquer on foil or directly into the surface of the foil. Alternatively, also nanoimprint methods can be used. In a final step the coating of the reflecting surface takes place, e.g. by vapor deposition. Metalized surfaces or interference layer systems can be applied by electron-beam vapor deposition sputtering or thermal vapor deposition in a vacuum. Subsequently the side with the vapor deposit is laminated with a cover layer for protection.

In the vapor depositing of the security element 10 having a moire magnification arrangement or an arrangement for unscaled representation the embossing of the micro cavities 3 is preferably carried out on the opposite side of the foil on which the lenses 6 are applied.

The employed coatings deliver a light/ dark contrast of the micro cavities 3 in a different depth or different aspect ratio.

Figure 16:
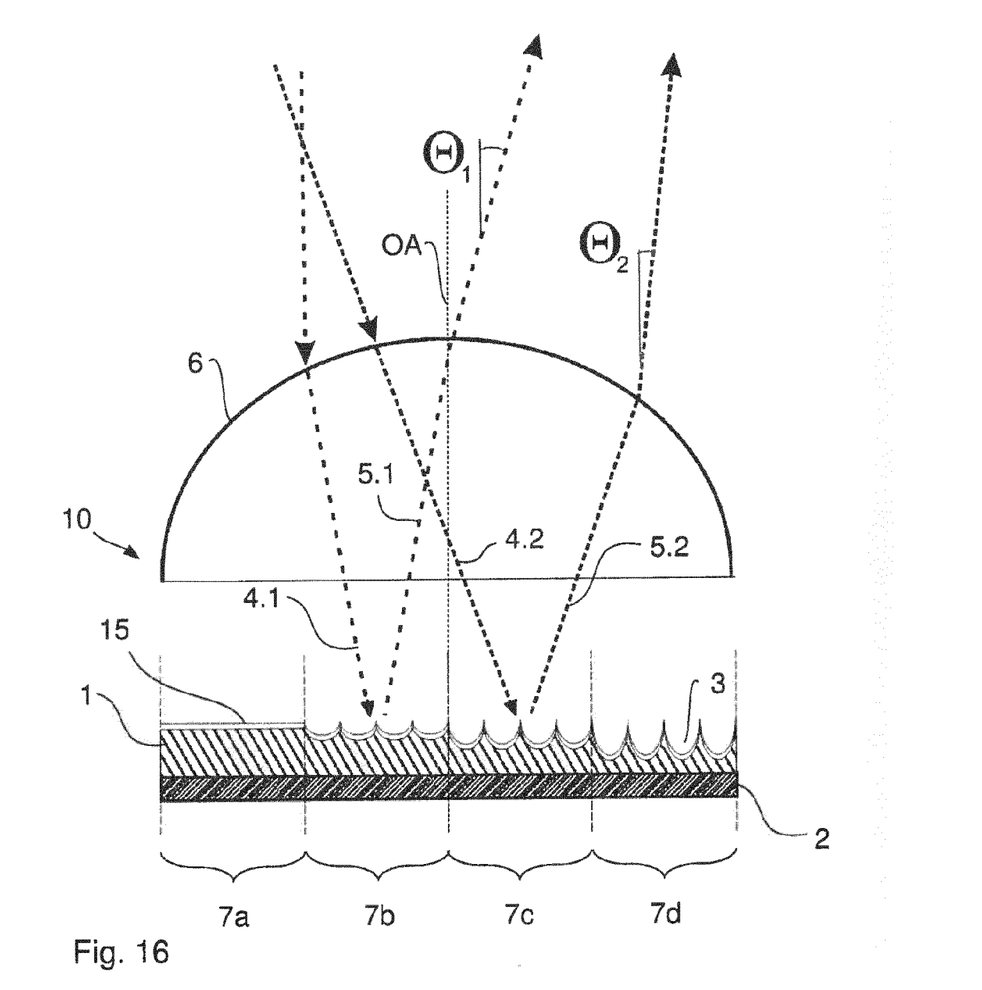

FIG. 16, similarly to FIG. 1, shows a sectional view through a reflecting micro cavity structure 1. Elements which correspond to those of FIG. 1 structurally or functionally are given the same reference numerals, and regarding the description of these elements, reference is made to the preceding description of the Figures. The micro cavity structure 1 has three regions 7b to 7d, in which micro cavities 3 of different depths are formed. In the region 7a no micro cavity structure is formed; the surface here is smooth. The micro cavities 3 are equipped with a coating 15, which is configured exemplarily as a color-shift coating here. It consequently comprises a metallic mirror layer, a dielectric spacer layer and a semitransparent metal layer as known in the state of the art for such coatings. This coating showing a color effect can also be omitted.

By way of example, two different light paths are drawn into FIG. 16 for the purpose of illustration. A first light path with a radiation 4.1 exits at an angle $\theta_1$ with reference to the direction of the optical axis OA, a second light path at the angle $\theta_2$. When a viewer is now disposed in a position in which he has a viewing direction that leads to the path taken by the radiation according to the incident radiation 4.1 and the exiting radiation 5.1, thus according to the angle $\theta_1$, he will perceive the image information of the region 7b. When he tilts the structure or changes his viewing angle by the angle difference $\theta_1-\theta_2$, he sees the image information of the region 7c, since the radiation takes the path according to 4.2 and 5.2.

The schematic representation according to FIG. 16 illustrates that a tilting effect is realized with the security element, as soon as in the area underneath a microlens 6 micro cavities 3 of different types are present, i.e. of different aspect ratio, which differ with regard to their reflection conduct. The employment of an interference layer on the micro cavities is a possible means for this purpose, since the color effect of the interference layers varies with the aspect ratio of the micro cavities 3. The micro cavities 3 of the regions 7b to 7d thus have a different color effect for a viewer. The mentioned change of the viewing angle thus leads to a color change. The tilting effect is a color effect as a result. Analogously, a grayscale effect is possible when the micro cavities 3 differ with regard to reflection due to their different aspect ratios.

For the described color effects or colored micro images 9 such coatings are suitable which have an angle-dependent dispersion, as already explained. Such interference layer structures usually consist of at least three layers: a semi-transparent metal layer, a metallic mirror layer and a dielectric spacer layer disposed between. The layer system of 7 nm chromium and 340 nm silicon dioxide on 60 nm aluminum delivers different colors upon perpendicular viewing and for oblique viewing below 45°. Such a structure is additionally preferably embedded in a PET foil of a refractive index of n=1.6. It appears as either yellow or blue at the two viewing angles. Such a coating is seen in reflection as green by a viewer when disposed above micro cavities of an aspect ratio greater than approximately 0.35. Consequently, the color impression depends on the aspect ratio, thereby making a corresponding motif design possible.

Semitransparent coatings such as e.g. the layer system of 15 nm aluminum/75 nm ZnS/15 nm aluminum are suitable particularly when besides one viewing possibility in reflection also image viewing in transmission is desired. Such embodiments are applied particularly in see-through windows of banknotes.

The micro images can also document hidden information on a value document, e.g. micro script, serial numbers, symbols, etc., which cannot be resolved by an unarmed eye, as an alternative to their employment with lenses. The micro images advantageously have substantially smaller structures than known laser engravings.

Of course the described micro images can also be employed without the mini lenses and magnification arrangements drawn in the Figures. The employment of the micro cavities then permits a very fine structuring of images or motifs, which is not possible with conventional printing methods.

The invention claimed is:

1. A security element for the manufacture of value documents having an upper side that makes available several micro images, wherein each micro image is formed by a micro cavity structure having a multiplicity of micro cavities disposed side by side;

the micro cavities have an extension of 0.5 μm to 3 μm respectively in a spatial direction disposed parallel to the upper side, the micro cavity structure is optically reflective or highly refractive on its surface, so that on the surface at least partial reflection takes place, for each micro image micro cavities of at least a first and a second type are present, which differ with regard to an aspect ratio of the micro cavities, wherein each micro image is structured by the at least two different types of micro cavities, and the micro cavities of the first and the second type differ with regard to their backscattering conduct.

2. The security element according to claim 1, wherein the aspect ratio of the micro cavities in the micro cavity structure varies in accordance with a predetermined pattern defining the micro image.

3. The security element according to claim 1, wherein several micro cavities of the first type are arranged to be disposed side by side in order to form a first image region of the micro image.

4. The security element according claim 1, wherein above the micro images an arrangement of lenses is formed and one lens is allocated to each micro image.

5. The security element according to claim 1, wherein for the micro images sub-wavelength structures are provided additionally, which make available an image element.

6. The security element according to claims 1, wherein for the micro images regions with unstructured or quasi-statistically structured surface are provided additionally, which make available an image element, in particular a reflecting background.

7. The security element according to claim 1, wherein the edges limiting the micro cavities also form edges of a motif of the micro image.

8. The security element according to claim 1, wherein the micro cavities are non-rotationally symmetric and channel-shaped, and extend respectively along a direction, wherein the two types also differ with regard to the direction.

9. The security element according to claim 1, wherein the extension of the micro cavities in the spatial direction parallel to the upper side varies along said spatial direction in accordance with a predetermined function.

10. The security element according to claim 1, wherein the micro cavities are equipped with a structure effecting a color effect.

11. The security element according to claim 1, wherein the micro cavities are disposed on at least two different height levels.

12. The security element according to claim 1, wherein the two types of micro cavities have the same extension in a spatial direction disposed parallel to the upper side but a varying depth.

13. A value document having a security element according to claim 1.

14. A manufacturing method for a security element for value documents wherein a substrate is made available that has an upper side, and on the upper side several micro images are produced, wherein each micro image is formed by a micro cavity structure having a multiplicity of micro cavities disposed side by side;

the micro cavities are given an extension of 0.5 μm to 3 μm respectively in a spatial direction disposed parallel to the upper side;

the micro cavity structure is configured to be optically reflective or highly refractive on its surface, so that on the surface at least partial reflection takes place;

for each micro image micro cavities of at least a first and a second type are provided, which differ by an aspect ratio of the micro cavities, wherein each micro image is structured by the at least two different types of micro cavities; and the micro cavities of the first and the second type differ with regard to their backscattering conduct.

15. The manufacturing method according to claim 14, wherein the micro image is defined by varying the aspect ratio of the micro cavities in the micro cavity structure in accordance with a predetermined pattern.

16. The manufacturing method according to claim 14, wherein several micro cavities of the first type are arranged to be disposed side by side in order to form a first image region of the micro image.

17. The manufacturing method according to claim 14, wherein above the micro images an arrangement of lenses is formed in order to magnify said micro images, wherein one lens is allocated to each micro image.

18. The manufacturing method according to claim 14, wherein for the micro images sub-wavelength structures are formed in addition, which make available an image element defining a dark background.

19. The manufacturing method according to claim 14, wherein for the micro images regions with unstructured surface are formed in addition, which make available an image element defining a reflecting background.

20. The manufacturing method according to claim 14, wherein the edges limiting the micro cavities are configured as edges of a motif of the micro image.

21. The manufacturing method according to claim 14, wherein the micro cavities are configured to be non-rotationally symmetric and channel-shaped, and extend respectively along a direction, wherein the two types also differ with regard to the direction.

22. The manufacturing method according to claim 14, wherein the micro cavities are equipped with a structure effecting a color effect defined as an interference layer structure.

23. A security element for the manufacture of value documents having an upper side that makes available several micro images, wherein each micro image is formed by a micro cavity structure having a multiplicity of micro cavities disposed side by side;

the micro cavities have an extension of 0.5 μm to 3 μm respectively in a spatial direction disposed parallel to the upper side, the micro cavity structure is optically reflective or highly refractive on its surface, so that on the surface at least partial reflection takes place, for each micro image micro cavities of at least a first and a second type are present, which differ with regard to an aspect ratio of the micro cavities, wherein each micro image is structured by the at least two different types of micro cavities, and the micro cavities are concave in at least one direction.

* * * * *